Jan. 1, 1963    R. E. CARREL    3,070,953
TEMPERATURE OPERATED PRIME MOVER
Filed May 18, 1961    2 Sheets-Sheet 1

INVENTOR
Ralph E. Carrel
BY Shoemaker and Mattare
ATTORNEYS

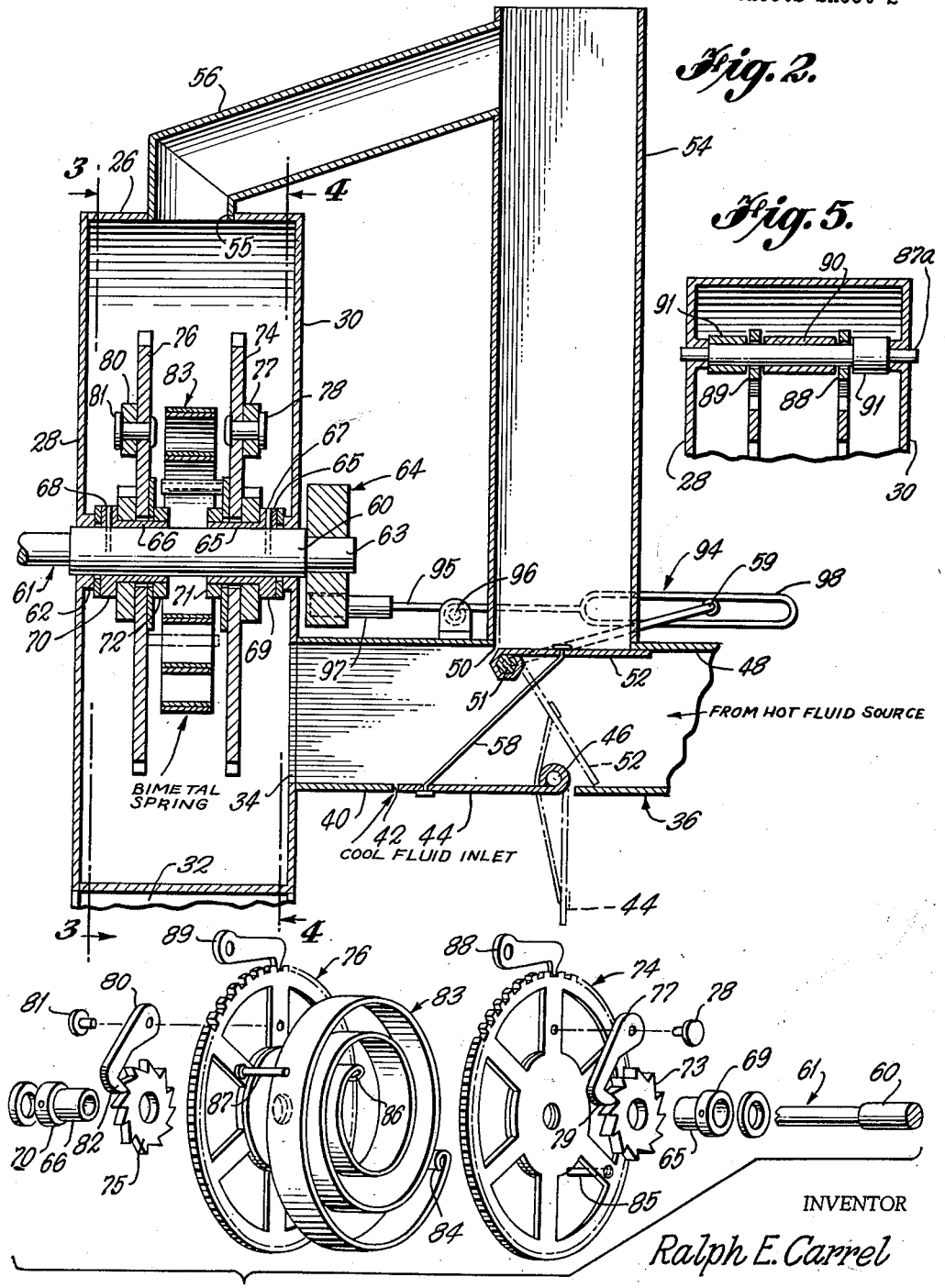

United States Patent Office 3,070,953
Patented Jan. 1, 1963

3,070,953
TEMPERATURE OPERATED PRIME MOVER
Ralph E. Carrel, 2901 Danville St., Hopewell, Va.
Filed May 18, 1961, Ser. No. 111,099
10 Claims. (Cl. 60—23)

This invention relates generally to prime movers and is directed more particularly to a prime mover or motor designed to be operated by changes in temperature of circulating fluid.

A particular object of the present invention is to provide a motor designed in a novel manner whereby to utilize heated fluid for effecting the rotation of a body, more particularly a rotatably supported shaft, which fluid would ordinarily be discharged into the atmosphere and the heat or thermal units thereof wasted.

Another object of the invention is to provide a motor designed to be operated by controlled changes in the temperature of a fluid for the actuation, that is, the expansion and contraction, of a heat sensitive element, more particularly a bi-metallic element operatively connected in a novel manner with a rotatably supported shaft.

A still further object of the invention is to provide a heat operated or temperature operated motor embodying the use of a coiled bi-metallic unit having its ends operatively coupled with a rotatable body such as a rotatable shaft, in a novel manner whereby the winding up and unwinding of the coil in response to high and low temperature changes will effectively drive or rotate the shaft at all times in one direction.

A further object of the invention is to provide a motor structure designed to be operated in response to controlled temperature changes, which is constructed in a novel manner to be used in association with a heat source such, for example, as a furnace, outdoor grill or the like with means for conducting some of the heat from such furnace or grill into a housing for the motor to utilize the heated gases for the expansion and contraction of a bi-metallic element operatively connected with a shaft in a manner to rotate the latter and it is a further object to combine with such structure a system of conduits and valving doors or flaps with means operatively connecting the latter to the motor whereby upon the expansion of the bi-metallic element to a predetermined degree through the subjection of the same to heated gases the flow of such heated fluid will be diverted from the element and cooler fluid caused to contact the element to bring about a contraction thereof.

The invention generally contemplates the provision of a housing having a shaft rotatably mounted therein and extending at one end therefrom for connection with a body to be moved by the motor.

The shaft has mounted thereon for free rotation thereabout a pair of toothed wheels or holding ratchets with each of which is operatively connected a holding pawl.

Adjacent to each of the holding ratchets the shaft has secured thereto for rotation therewith a driving ratchet and each of the holding ratchets carries a driving pawl arranged for engagement with the adjacent driving ratchet.

Interposed between the holding ratchets is a flat coiled or spiral bi-metallic element which encircles the shaft and which has one end secured to one holding ratchet and the other end secured to the other holding ratchet.

Means is provided for conducting both hot and cold fluids into the housing for contact with the bi-metallic element and the housing is provided with a top outlet for the fluid and means is provided for periodically shutting off the flow of heated fluid and permitting the introduction of colder fluid into the housing to effect the alternate expansion and contraction of the element and such control means is actuated from the rotatable shaft.

The invention will be best understood from a consideration of the following detail description taken in connection with the accompanying drawings, wherein, in the drawings:

FIG. 2 is a sectional view taken in a vertical plane along the axis of rotation of the motor shaft and showing in broken outlines the open positions of the furnace valves by which the flow of hot and cold fluid into the motor housing is controlled.

FIG. 5 is a detail section taken substantially on the line 5—5 of FIG. 3.

FIG. 6 is an exploded view illustrating the various elements of the motor mechanism.

Figure 1:
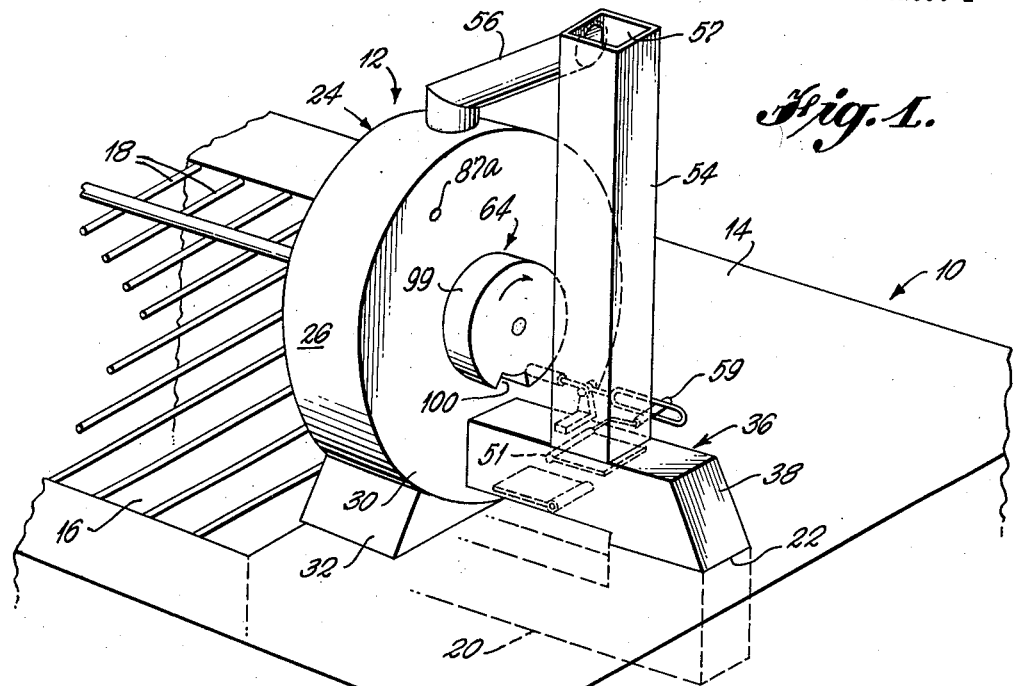
FIG. 1 is a perspective view of the motor structure of the present invention showing the same in association with a heat producing structure such, for example, as an outdoor grill, a portion only of such structure being shown.

Referring now more particularly to the drawings the numeral 10 generally designates a heat producing structure in association with which the present invention is illustrated and which structure is here shown as comprising a portion of an outdoor grill.

The numeral 12 generally designates the motor structure or prime mover structure of the present invention operatively associated with the heat producing structure of the grill.

For the purpose of illustrating one way in which the heated fluid such as the hot gases from the structure 10 may be carried into the motor structure for effecting the operation thereof, the structure 10 is shown as having a relatively wide top portion 14 disposed at one side of the fire box area 16 over which area grill bars 18 are shown supported and the numeral 20 designates in broken lines a hot air duct leading from the fire box area 16 to an upwardly directed outlet 22 which opens through the surface 14.

The motor structure embodies a housing 24, here shown as being of circular form and having the surrounding or circular wall 26 and the opposite end walls 28 and 30 which for convenience of description may be referred to respectively as the front and back walls, the front wall 28 being on the fire box side of the furnace structure.

A suitable base 32 is provided for supporting the housing 24 on the surface 14.

The back wall 30 has formed therethrough adjacent to the bottom portion thereof a fluid inlet opening 34 and connected with the wall 30 and leading from this opening outwardly or rearwardly is a fluid conducting conduit 36 which at its outer end terminates in the downwardly opening hood 38 which is positioned over the opening 22 to receive and collect therefrom the hot fluid in the form of gases issuing from fuel in the fire box to conduct such hot fluid or gases into the housing.

As shown in FIG. 2, the conduit 36 has a bottom wall 40 with a cool air inlet opening 42 therein which has associated with it a closure door or flap valve 44 which is supported for swinging movement on a horizontal shaft 46 extending transversely of the conduit.

The conduit 36 also has a top wall 48 in which is formed an outlet opening 50. This opening 50 is positioned to extend partway over the side of the opening 42 adjacent to which the shaft 46 is located and the side of the opening 50 which lies approximately over the center of the opening 42 has extending thereacross, inside the conduit, a shaft 51 on which is supported for swinging movement the shutoff door or flap valve 52 which has a closed position in which it is horizontally disposed across the opening 50 and an open position in which it extends downwardly at an angle across the conduit as indicated in broken lines to rest upon the bottom wall 40 of the conduit as indicated in broken lines to thus deflect heated fluid upwardly through the opening 50 and into the vertical chimney 54 which at its lower end is joined to the top wall 48 of the conduit around the opening 50.

The top of the housing 24 has formed in the wall 26 thereof the escape opening 55 for the fluids passing through the housing and this opening has connected therewith one end of an exhaust pipe 56, the other end of which is connected with and opens into the top part of the chimney 54 as shown. Thus fluids passing upwardly through the chimney or through the exhaust pipe 56 escape to the atmosphere through the open top 57 of the chimney.

The doors 44 and 52 are operatively coupled together by a cable 58, one end of which connects with the middle portion of the door 52 while the other end is connected to the door 44 adjacent to the edge thereof which is remote from the shaft 46. This cable is of the proper length so that when the upper door 52 is drawn into horizontal closed position the lower door 44 will also be drawn into closing position in the inlet opening 42 and when the door 52 drops to fluid deflecting position, as shown in broken lines, the door 44 will swing down by gravity to a dependent position as is also shown in broken lines, so that cool air may enter the opening or inlet 42 to pass through the opening 44 into the housing 24.

The shaft 51 may properly be identified as a crank shaft as it carries on one end and projects outwardly beyond a side of the conduit 36, the crank handle 59 which is coupled in the manner hereinafter described with operating mechanism for effecting the opening and closing of the doors or flap valves at proper periods in association with the operation of the motor.

The numeral 60 designates an end portion of a shaft which is generally designated 61 and which end portion extends through the center of the circular housing and is supported at its ends in suitable bearings 62 carried by the walls of the housing as shown in FIG. 2. A section of the shaft extends rearwardly from the back wall as indicated at 63 and supports a notched cam wheel which is generally designated 64. The details and operation of this cam wheel and mechanism connected therewith will be hereinafter more particularly described.

Within the housing the shaft portion 60 has mounted thereon the two collars 65 and 66 which are secured thereto by pins 67 and 68 or they may be secured by conventional keys or in any other suitable manner. These collars are in axially spaced relation on the shaft portion and the collars are shown as having the integral flanges 69 and 70 at one end through which flanges the pins are shown extended in FIG. 2, while the opposite ends of the collars have removable flanges or nuts 71 and 72 thereon.

Mounted upon the collar 65 is a driving ratchet 73 and a holding ratchet 74 and mounted upon the other collar 66 is a driving ratchet 75 and a holding ratchet 76. Each of the driving ratchets 73 and 75 is fixed or secured to its supporting collar to turn therewith while the holding ratchets 74 and 76 are supported for free rotation on their respective collars.

The driving ratchets are relatively small in diameter as compared with the holding ratchets, as is clearly shown in the several views of the mechanism, particularly in FIG. 6.

The holding ratchets are illustrated as being in the form of spoked wheels and upon each holding ratchet there is pivotally mounted a driving pawl 77. The driving pawl on the holding ratchet 74 is pivotally secured to the adjacent ratchet by a suitable pin member 78 while the point or nose 79 is positioned to have engagement with the adjacent driving ratchet 73. The driving pawl on the holding ratchet 76 is designated 80 and this pawl is pivotally connected with the adjacent ratchet by the pivot pin 81 in a position where the nose 82 of the pawl can engage the driving ratchet 75.

The points of the teeth of the two driving ratchets 73 and 75 are extended in the same direction and the nose ends 79 and 82 of the driving pawls are extended in the same direction as shown in FIG. 6, the direction in which the free or nose ends of the pawls 77 and 80 extend and the direction in which the points of the driving ratchet teeth extend being opposite to the direction of rotation of the shaft when the same is driven by the mechanism.

Encircling the portion 60 of the shaft between the holding ratchets 74 and 76 is a spiral coil heat responsive element which is generally designated 83. This heat responsive element is of the bi-metallic form, as shown in FIG. 2.

The outer end of the bi-metallic element coil is connected with one of the holding ratchets, here shown as the ratchet 74, by means of the sleeve on the end thereof, indicated at 84, which receives the pin 85, secured at one end to the ratchet 74 on the inner side thereof. The inner end of the bi-metallic coil is connected to the other ratchet 76 by having the sleeve 86 at such end receiving the pin 87 which is secured at one end to the inner side of the ratchet 74. Thus it will be seen that the spiral coil forming a bi-metallic element is freely suspended by its ends between the holding ratchets 74 and 76.

Figure 3:
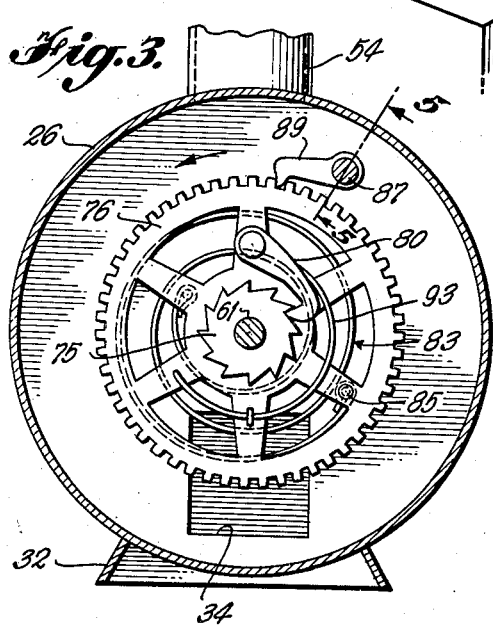
FIG. 3 is a sectional view taken on the line 3—3 of FIG. 2, looking in the direction of the arrows.

Mounted between the front and back walls 28 and 30 of the housing at an elevation above the toothed peripheries of the holding ratchets is a shaft 87a on which are pivotally swung the two holding pawls 88 and 89. The holding pawls 88 and 89 are maintained in spaced relation with one another by an interposed sleeve 90 and they are maintained at proper spaced relation with the adjacent walls by sleeves or collars 91 so that each of the holding pawls is free to swing downwardly into engagement with the toothed periphery of an underlying holding ratchet. As shown in FIG. 3, the pawl 89 is in engagement with the ratchet 76, while the pawl 88, shown in FIG. 4, is in engagement with the ratchet 74.

Figure 4:
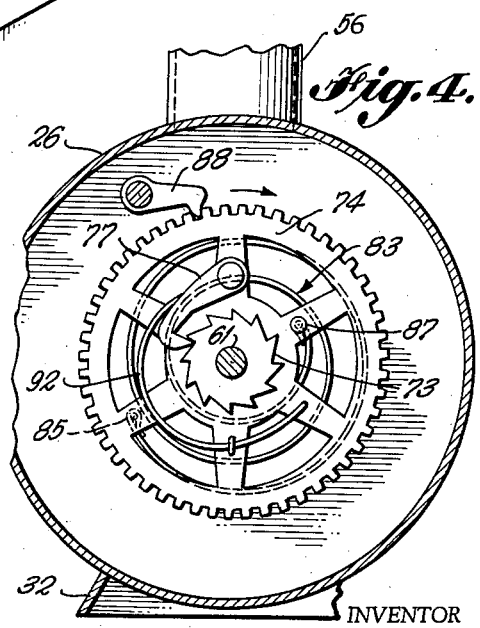
FIG. 4 is a sectional view taken on the line 4—4 looking in the direction of the arrows.

It will be understood that FIGS. 3 and 4, taken in sectional planes lying on opposite sides of the pair of holding ratchets and driving ratchets, show the adjacent ratchets from opposite directions or opposite points of view so that in looking at the holding pawl and ratchet in FIG. 3 its direction of rotation is indicated as counterclockwise, while looking at the holding pawl and ratchet 74 and 88 from the point of view of FIG. 4, the same are shown or indicated as turning clockwise. The shaft and all of the pawls and ratchets turn in a clockwise direction, as will be understood from a consideration of FIG. 6.

The driving pawl 77 is engaged by a spring 92 to maintain the free end or nose in constant engagement with the driving ratchet 73.

The driving pawl 80, as shown in FIG. 3, is engaged by a spring 93 which holds its free end or nose in operative engagement with the driving ratchet 75.

By positioning the holding pawls 88 and 89 above the holding ratchets, as shown in FIGS. 3 and 4 and in FIG. 6, the effect of gravity will be sufficient to maintain the pawls in operative engagement with their respective ratchets, however, spring means may be used for this purpose if found desirable, particularly if it should be found desirable to locate the pawls 88 and 89 in lower positions.

The opening and closing of the gate valves 44 and 52 may be effected by any suitable means such as the linkage generally designated 94 and forming an operative coupling between the cam wheel 64 and the crank handle 59. This linkage comprises a relatively long lever arm 95, here shown as pivotally mounted intermediate its ends as at 96, the mounting here being shown as positioned upon the top of the conduit 36. The forward end of the arm 95 may carry a follower roller 97 while the opposite or rearward end is slotted or otherwise formed as indicated at 98, for loose coupling with the crank 59 in the manner illustrated, whereby oscillation of the lever 95 on the horizontal pivotal support 96 will effect the swinging of the crank 59 to bring about the opening and closing of the valve doors 44 and 52.

The cam member 64 is shown as comprising a disc body having the circular peripheral surface 99 in which a notch or recess 100 is formed and the follower 97 is positioned so as to engage across the circular surface 99 of the cam member and to move or swing into the recess 100 when the cam is rotated to the proper position by the shaft 61.

It will be seen upon reference to FIG. 1 that the follower 97 will be at an elevation above the lowest portion of the cam surface 99 when the lever is horizontal and the valve gates are closed. Consequently, when the cam rotates to a poistion where the recess will receive the follower 97, the outer end of the lever 95 will drop.

This action will be brought about both by gravity and by the weight of the crank 59 engaged in the slotted end of the lever so as to permit the valve doors to open. As the cam disc continues to rotate the approaching side of the recess 100 will engage the elevated follower 97 and force the same down, which action will bring about the closing of the valve doors and will also lower the follower 97 to a position where it will be released from the recess 100 to ride onto the surface 99.

In the operation of the prime mover it will be understood that the valve doors 44 and 52 will be closed when hot gas or hot fluid is introduced into the conduit 36 so that such fluid will pass into the housing and have the desired effect upon the bi-metallic spiral coil element 83. This effect of the heat on the element will be to expand the element, which action will cause the coil to unwind. Thus in tending to unwind the outer end of the coil which is connected by the sleeve 84 to the pin 85 carried by the holding ratchet 74 will impart a clockwise turning thrust to the holding ratchet.

The inner end of the bi-metallic coil which is connected by the sleeve 86 to the pin 87, carried by the holding ratchet 76 will tend to give a reverse or counterclockwise rotation to the ratchet 76 but this will be opposed by the engagement of the pawl 89 with the ratchet 76 and thus the inner end of the coil will be held against movement. Accordingly, only clockwise rotation will be given to the holding ratchet 74 and this will impart corresponding movement to the driving pawl 77 and to the driving ratchet 73 which, being secured to the shaft 61, will turn the latter in a clockwise direction.

When the bi-metallic material has expanded to a predetermined degree to turn the cam 64 to a position where the lever 95 will swing to permit the valve doors to drop, the heated fluid will be diverted from the conduit 36 into the chimney 54 and cooler or cold fluid will be permitted to enter the conduit and pass into the casing. This will bring about a reverse action or contraction of the expanded coil 83.

Upon reversal of the action of the coil, that is, by the contraction thereof under the effect of colder fluid the inner end of the coil which is attached to the holding ratchet 76 by the pin 87 will impart a clockwise rotary thrust to the holding ratchet and the tendency of the outer end of the coil to move reversely or to draw in by the winding up of the coil will exert a thrust in a direction tending to turn the holding ratchet 74 counterclockwise but this will be opposed by the holding pawl 88. Thus continued clockwise rotation will be given to the shaft by the clockwise turning of the holding ratchet 76 which moves the driving pawl 80 and the driving ratchet 75 in a clockwise direction.

From the foregoing it will be seen that by the provision of the single spiral coiled bi-metallic element operatively coupled with the shaft which it encircles, in the manner described, continuous clockwise rotation can be given to the shaft by the alternate heating and cooling of the element.

While reference has been made specifically to the clockwise rotation of the shaft by the mechanism, obviously reverse or counterclockwise rotation could be given by reversing the ratches and pawls.

In addition to the foregoing, while only one motor has been illustrated as operatively connected with the shaft 61, it is within the purview of the present invention to couple two or more such motors with the same shaft as this may be readily done by disposing the same about 45° out of phase or, in other words, having the motor phased about 45° apart whereby continuous and uniform rotation of the shaft may be obtained.

As this invention may be embodied in several forms without departing from the spirit or essential characteristics thereof, the present embodiment is therefore illustartive and not restrictive, since the scope of the invention is defined in the appended claims, and all changes that fall within the metes and bounds of the claims, or that form their functional as well as conjointly cooperative equivalent, are therefore intended to be embraced by those claims.

I claim:

1. Mechanism for imparting rotary motion to a rotatably supported body, said mechanism comprising a spiral coil of an element reactive to high and low temperatures to respectively coil and uncoil, means for alternately heating and cooling said coil, said coil surrounding the axis of rotation of said body, means operatively coupling one end of said coil with said body for transmitting rotation to the body in one direction upon the unwinding of said coil, means operatively coupling the other end of the coil with said body for transmitting rotation to the body in the said one direction upon the winding up of the coil, means for securing said other end of the coil against movement when the said one end thereof is transmitting rotation to the body, and means for securing the said one end of the coil against movement when the said other end thereof is transmitting rotation to the body.

2. The invention according to claim 1, wherein said spiral coil element is a bi-metallic element.

3. A temperature operated prime mover comprising a housing, a shaft supported therein for rotation and extending at one end to the exterior thereof, a heat sensitive bi-metallic spiral coil element in the housing and encircling the shaft, means forming a driving coupling between one end of said coil and the shaft at one side of the coil for imparting rotation to the shaft in one direction upon expansion and unwinding of the coil, means forming a driving coupling between the other end of the coil and the shaft on the opposite side of the coil for imparting rotation to the shaft in the said one direction upon the contraction and winding up of the coil, means for holding the said other end of the coil against movement in the said direction of rotation of the shaft when the said one end thereof is imparting rotation to the shaft, means for holding the said one end of the shaft against movement in the direction of rotation of the shaft when the said other end thereof is imparting rotation to the shaft, means for conducting heated fluid from a heat source into the housing for contact with said element, means for exhausting such fluid from the housing, and means for shutting off the flow of heated fluid to the housing and introducing cooler fluid thereinto.

4. The invention according to claim 3, wherein said last mentioned means is operatively coupled with and actuated by the shaft in timed relationship with the winding and unwinding of said bi-metallic elements.

5. The invention according to claim 3, wherein the means forming a driving connection between each end of the coil and the shaft includes a driving ratchet fixed to the shaft to turn therewith, a driving pawl engaging the ratchet and a member mounted on the shaft for free rotation thereon and pivotally supporting the pawl and having the end of the coil secured thereto.

6. A temperature operated prime mover comprising a housing, a shaft supported therein for rotation and extending at one end to the exterior thereof, a heat sensitive bi-metallic spiral coil element in the housing and encircling the shaft, means forming a driving coupling between one end of said coil and the shaft at one side of the coil for imparting rotation to the shaft in one direction upon expansion and unwinding of the coil, means forming a driving coupling between the other end of the coil and the shaft on the opposite side of the coil for imparting rotation to the shaft in the said one direction upon the contraction and winding up of the coil, a holding ratchet mounted on the shaft on each side of the coil for free rotation on the shaft and forming a part of the driving coupling, said driving coupling between said one end of the coil and the shaft including a means securing the said one end to one holding ratchet, said driving coupling between the said other end of the coil and the shaft including a means securing the said other end to the other ratchet, a pair of holding pawls pivotally supported in the housing for independent movement and each positioned for engagement with one holding ratchet, said holding pawls each functioning to hold the adjacent holding ratchet and the end of the coil attached thereto against turning when the coil is functioning to impart turning movement to the shaft through the other end thereof and the other holding ratchet, means for conducting heating fluid from a heat source into the housing for contact with the bi-metallic coil element, means for exhausting such fluid from the housing, and means for shutting off the flow of heated fluid to the housing and introducing cooler fluid thereinto.

7. A temperature operated prime mover comprising a housing, a shaft supported therein for rotation and extending at one end to the exterior thereof, a heat sensitive bi-metallic spiral coil element in the housing and encircling the shaft, a holding ratchet on each side of said coil and supported for free rotation on the shaft, an operative coupling between the outer end of said coil and one holding ratchet, an operative coupling between the inner end of the coil and the other holding ratchet, a driving ratchet on the outer side of each holding ratchet from the coil element and secured on the shaft to turn therewith, a spring pressed driving pawl on each holding ratchet and engaging the adjacent driving ratchet, a pair of holding pawls supported in the housing for independent action and each engaging a holding ratchet, said driving pawls and driving ratchets having the same positions relative to the shaft whereby they both drive the shaft in the same direction upon the alternate expansion and contraction of the coil element, the said holding pawls alternately holding their respective holding ratchet from turning in the opposite direction to the direction of rotation of the shaft when the shaft is driven by the said alternate expansion and contraction of the coil element, and means facilitating the alternate delivery of hot and cold fluid into the housing.

8. The invention according to claim 7, wherein the said last means comprises a conduit connected at one end to the lower part of the housing and having an outer end for receiving the hot fluid, a chimney rising from and opening at its lower end into the conduit, an exhaust means leading from the top of the housing, and valve means operatively connected with the conduit and the chimney having an open position for diverting the hot fluid from the conduit into the chimney, and opening the conduit at a location to introduce cold fluid into the housing.

9. The invention according to claim 8, with mechanism operatively coupled between said shaft and the said last means by which the said valve means is actuated synchronously with the expansion and contraction of the coil element.

10. The invention according to claim 8, wherein said valve means includes a pair of operatively coupled pivotally mounted valve elements, a cam element on and rotated by said shaft, a pivoted follower engaging said cam element, and an operative coupling between said follower and a valve element.

References Cited in the file of this patent

UNITED STATES PATENTS

| | | |
|---|---|---|
| 2,617,595 | Alban et al. | Nov. 11, 1952 |
| 2,729,756 | Euler et al. | Jan. 3, 1956 |